United States Patent [19]

Wojtowicz

[11] 4,197,284

[45] Apr. 8, 1980

[54] PROCESS FOR THE PRODUCTION OF CALCIUM HYPOCHLORITE COMPOSITIONS

[75] Inventor: John A. Wojtowicz, Cheshire, Conn.

[73] Assignee: Olin Corporation, New Haven, Conn.

[21] Appl. No.: 946,266

[22] Filed: Sep. 27, 1978

[51] Int. Cl.$^2$ .............................................. C01B 11/06
[52] U.S. Cl. ................................ 423/474; 252/187 H
[58] Field of Search ...................... 252/187 R, 187 H; 423/241, 473, 474, 499

[56] References Cited

U.S. PATENT DOCUMENTS

| | | | |
|---|---|---|---|
| 1,718,285 | 6/1929 | George | 423/474 |
| 2,036,311 | 4/1936 | White | 423/241 |
| 2,036,375 | 4/1936 | Vincent | 423/477 |
| 4,105,565 | 8/1978 | Wojtowicz | 252/187 H |

*Primary Examiner*—O. R. Vertiz
*Assistant Examiner*—Thomas W. Roy
*Attorney, Agent, or Firm*—James B. Haglind; Donald F. Clements

[57] ABSTRACT

Calcium hypochlorite compositions useful as bleaching agents and disinfectants are produced by the reaction of solid granular hydrated lime and a solid granular alkali metal hydroxide with chlorine gas. The process takes place in the absence of a solvent and produces dry, free-blowing Ca(OCl)$_2$ compositions.

6 Claims, No Drawings

PROCESS FOR THE PRODUCTION OF CALCIUM HYPOCHLORITE COMPOSITIONS

This invention relates to a process for the production of calcium hypochlorite compositions useful as bleaching agents, disinfectants and decontamination agents.

Calcium hypochlorite is a commercially available product which is widely used as a commercial bleaching and sanitizing agent. It is produced by processes which react hydrated or slaked lime in solution with a chlorinating agent such as chlorine. The calcium hypochlorite product is obtained as a wet cake which requires careful drying to evaporate large amounts of water present while minimizing the loss of available chlorine by thermal decomposition.

There is need, however, for a process for producing calcium hypochlorite compositions which does not require a liquid solvent medium and which does not require a separate drying step.

It is an object of the present invention to provide a process for producing calcium hypochlorite compositions in the absence of a liquid solvent medium.

Another object of the present invention is to provide a process for producing calcium hypochlorite compositions in which evaporation of a solvent or separation from a solution is not required.

A further object of the present invention is a process for producing calcium hypochlorite compositions which are obtained as dry products.

These and other objects of the invention are provided in a process for producing calcium hypochlorite compositions which comprises reacting solid, granular hydrated lime, a solid granular alkali metal hydroxide and chlorine gas to form a reaction mixture, agitating said reaction mixture and recovering a calcium hypochlorite composition having an available chlorine content of up to about 50 percent therefrom.

In the novel process of the present invention, hydrated lime is employed in the solid form. The lime should have an available lime content suitable for producing calcium hypochlorite compositions of the desired available chlorine content. Available lime represents the total calcium oxide (CaO) content in the lime, CaO being the active ingredient. The term "available lime" is synonymous with the term "active lime" and both provide a means for expressing the concentration of CaO in hydrated lime. Suitable limes include those having an available lime content of at least 75 percent, and preferably at least 90 percent.

Hydrated lime is used in a particulate or granular form having a particle size of less than about 100 and preferably less than about 50 microns.

Dry, granular alkali metal hydroxides such as sodium hydroxide or potassium hydroxide are admixed with the hydrated lime in a suitable reactor. The grannular alkali metal hydroxide used has a particle size of less than about 500 and preferably less than about 300 microns.

In the novel process of the present invention, the solid hydrated lime and a solid alkali metal hydroxide, for example, sodium hydroxide, are reacted with gaseous chlorine to form calcium hypochlorite where the reaction is believed to take place according to the following equation:

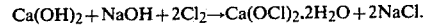

$$Ca(OH)_2 + NaOH + 2Cl_2 \rightarrow Ca(OCl)_2 \cdot 2H_2O + 2NaCl.$$

The reaction proceeds using substantially stoichiometric proportions of sodium hydroxide with a small excess of lime and gaseous chlorine. Excessive amounts of sodium hydroxide can result in undesired side reactions. Large excesses of lime can be employed if a calcium hypochlorite product having a low concentration of available chlorine is desired. Chlorination of the reaction mixture is continued until from about 95 to about 99 percent of the hydrated lime is converted to calcium hypochlorite.

During the reaction, the granular reactants are agitated by mechanical means or by employing a rotating reactor having means such as flights to cascade the dry solids. A rotary reaction vessel, equipped with lifting means such as flights, provides particle attrition during the reaction to prevent agglomeration or an increase in the particle size. The process may be conducted in a fluidized bed where the gaseous chlorine can be used advantageously to fluidize the hydrated lime and alkali metal hydroxide. The principles in the practice of employing fluidized bed reactors are well known as described, for example, in the *Chemical Engineering Handbook*, edited by R. H. Perry and C. H. Chilton, 5th edition, McGraw-Hill, 1973, section 20, pages 64–74.

Another method of preventing agglomeration during the reaction removes a portion of the product from the reactor, passes the product through a screen and crushes or grinds oversized particles before returning them to the reactor.

The reaction vessel may be provided with cooling means to remove the heat of chlorination generated during the reaction. For example, the reactor may be externally cooled or it may be supplied with a cooling medium such as cooled granular materials such as pebbles which are non-reactive with the components of the reaction mixture.

Suitable reaction temperatures include those in the range of from about −10° to about 60° C., preferably at from about 10° to about 40° C.

It may be desirable, particularly during the initial stages of the reaction, to add small amounts of water to facilitate the chlorination reaction. Suitable amounts of water include those of from about 1 to about 10 percent of the weight of hydrated lime used.

Any suitable reaction times may be used. For commercial production, short reaction times are desirable and these can be obtained by conducting the reaction in a rotary reactor or controlling the particle size as discussed above.

The calcium hypochlorite compositions prepared by the novel process of the present invention usually have an available chlorine content of up to about 50 percent, for example, in the range of from about 45 to about 50 percent by weight of $Ca(OCl)_2$. In addition to calcium hypochlorite, the compositions contain an alkali metal chloride. The calcium hypochlorite compositions have a calcium chloride content of less than about 1 percent and a calcium chlorate content of less than about 3 percent. The compositions can be readily dried by conventional means.

These highly stable calcium hypochlorite compositions are suitable as bleaching and sanitizing agents. They are particularly suitable to be used in place of "tropical" or "supertropical bleaches" which have special utility as decontamination agents, for example, for mustard gas as well as being useful in sanitizing public water supplies. By maintaining a low calcium chloride content, the compositions produced by the process of the present invention will remain stable in the presence of high temperatures and high humidity.

The process of the present invention is further illustrated by the following examples. All percentages are by weight unless otherwise specified.

EXAMPLE 1

Hydrated lime (42.2 g, 0.549 mole) was fed to a rotary reaction vessel. The lime had a total alkalinity of 98.04 percent with about 90 percent of the particles being smaller than 45 microns. Dry sodium hydroxide (40.4 g, 0.997 mole) was ground to provide particles sized in the range of from about 300 to <5 microns and added to the reaction vessel. Chlorine gas (71 g, 1 mole) was fed to the reaction vessel at a rate of 0.2 g per minute. The reaction vessel was equipped with vanes which cascaded the solid reactants during the chlorination. The reaction vessel was cooled externally to maintain the reaction temperature in the range of 15-20° C. After about 6 hours, the product was removed from the reactor and analyzed. The yield of $Ca(OCl)_2$ dihydrate was 91.3 percent based on a conversion of 87.9 percent (consumption of total alkalinity). The product was dried in a vacuum oven at room temperature for 16 hours. The dry, free-flowing product had an available chlorine content of 44.5 percent, contained 3.5 percent of water of hydration and also contained 3.5 percent of calcium chlorate and 0.0 percent of calcium chloride.

A sample of the calcium hypochlorite product was contacted with a lighted match, but did not propagate thermal decomposition when the flame was removed.

EXAMPLE 2

The procedure of Example 1 was repeated with the exception that water in an amount of 4.6 percent by weight of the lime used was admixed with the lime before the lime was fed to the reactor. Calcium hypochlorite dihydrate was obtained in 91.1 percent yield based on a conversion of 93.4 percent. After vacuum drying, it contained 45.4 percent available chlorine and 4.1 percent water of hydration.

EXAMPLE 3

The procedure of Example 1 was modified by admixing 2.6 percent of water with the lime prior to its addition to the reactor. Chlorine gas was fed to the reactor to partially chlorinate the lime before the powdered sodium hydroxide was added. Following the addition of sodium hydroxide, the reaction procedure was identical to that of Example 1. Calcium hypochlorite dihydrate was obtained in a yield of 87.3 percent based on a 93.5 percent conversion. Following vacuum drying at 50° C., the product contained 0.4 percent water of hydration and had an available chlorine content of 44.8 percent.

What is claimed is:

1. A process for the production of a calcium hypochlorite composition which comprises reacting solid granular hydrated lime, a solid granular alkali metal hydroxide, and chlorine gas in the adsence of a liquid solvent medium to form a reaction mixture, agitating said reaction mixture and recovering a calcium hypochlorite composition having an available chlorine content of up to about 50 percent therefrom.

2. The process of claim 1 in which said solid granular hydrated lime has a particle size of less than about 100 microns.

3. The process of claim 2 in which said reaction is conducted at a temperature in the range of from about −10° to about 60° C.

4. The process of claim 3 in which said solid granular alkali metal hydroxide has a particle size of less than about 500 microns.

5. The process of claim 4 in which said alkali metal hydroxide is sodium hydroxide.

6. The process of claim 5 in which said reaction temperature is from about 10° to about 40° C.

* * * * *